Patented Feb. 18, 1936

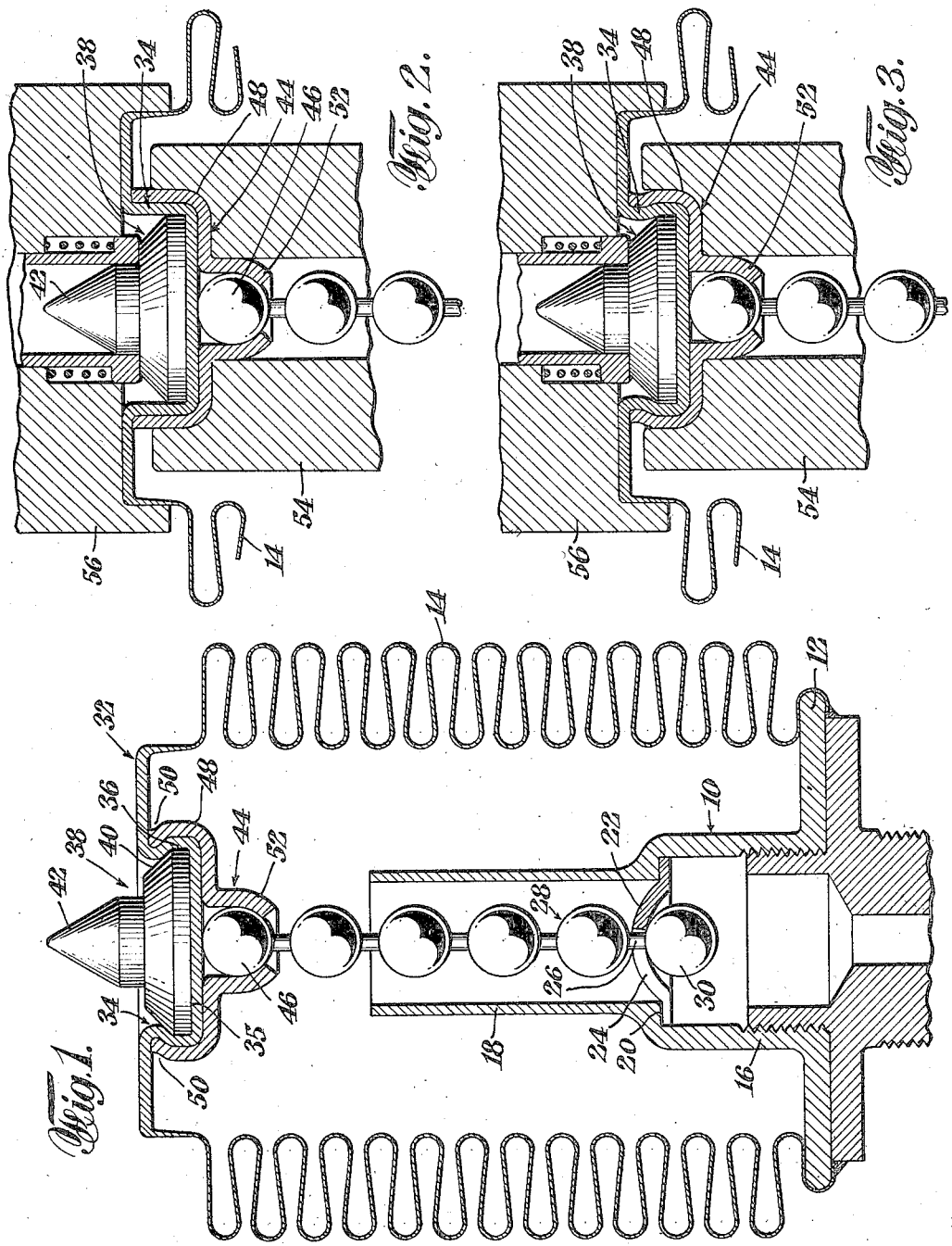

2,031,424

UNITED STATES PATENT OFFICE 2,031,424

FLEXIBLE INTERNAL STOP

Joseph J. McMahon, Bridgeport, Conn., assignor to Bridgeport Brass Company, Bridgeport, Conn., a corporation of Connecticut Application May 4, 1935, Serial No. 19,814

7 Claims. (Cl. 297—8)

This invention relates to a bellows thermostat and the like provided with an internal chain or other laterally flexible, lengthwise non-extensible stop member for limiting the expansion movement of the bellows; and more particularly relates to improved means for securing said flexible stop member to the movable end of the bellows and also for securing a valve or otherwise useful projection to the outside of said bellows-end.

Heretofore it has been thought necessary to accomplish the foregoing by providing a member which was soldered to a seat in an opening through the movable end of the bellows, the portion of said member within the bellows serving as an attachment for the flexible stop member and the portion of said member outside of the bellows serving as the aforesaid valve and otherwise useful external part.

The disadvantage of the foregoing was that it weakened the bellows and invited leaks. The present improvement effects the foregoing objects in a highly satisfactory manner with complete avoidance of the disadvantages of the earlier construction and practice.

To the accomplishment of the foregoing, and such other objects as may hereinafter appear, this invention comprises the construction, combination and arrangement of parts hereinafter described and then sought to be defined in the appended claims, reference being had to the accompanying drawing forming a part hereof, and which show for the purpose of illustrative disclosure a preferred embodiment of my invention, it being expressly understood, however, that various changes may be made in practice within the scope of the claims without digressing from my inventive idea.

In the drawing:

Fig. 1 is a longitudinal sectional view partly in elevation of a bellows embodying my improvements, and Figs. 2 and 3, show successive stages in the procedure of securing the improved construction to the movable end of the bellows, as to which Fig. 1 shows the final stage and the finished article, said Figs. 2 and 3 showing only the movable end of the bellows and the operating ends of the tools for securing the construction to the bellows-end.

Referring now to the drawing, the reference character 10 designates the usual base member for a thermostat bellows having a flange 12 to which the stationary end of the bellows 14 is secured by any conventional means such as solder. This base member 10 is formed with the internally threaded sleeve 16 that extends into the bellows and which is set back a distance from the end to form the smaller sleeve 18 and to form the internal shoulder 29 at the junction of the sleeves 16 and 18.

Positioned within the sleeve 16 and adapted to abut shoulder 20 and be held thereby is the dished washer 22 which is provided with a radial slot 24 to receive the flexible portion 26 of the bead chain 28. It will be seen from an inspection of the drawing that the slot 24 is smaller than the beads on the chain and that when the bellows is expanded, the bead 30, for example, is prevented from outward movement by the washer 22 so that the washer forms an anchor for that end of the chain. The other end of the chain is secured to the movable end 32 of the bellows.

While I have shown a bead chain, I am not to be restricted thereto as other types of chains or similar laterally flexible and lengthwise non-extensible connecting means may be used between the ends of the bellows to serve as a flexible stop to limit expansion. The end of the smaller sleeve 18 adjacent the movable end 32 of the bellows forms a stop to limit collapse of the bellows. Also it may be noted that the sleeve 18 is made of such size as to accommodate the chain 28 when the bellows is collapsed.

The movable end 32 of the bellows is inwardly cupped, said cup bearing the general designation 34 with its bottom indicated at 35 and its peripheral wall at 36, the latter having its mouth integral with the remainder of the movable end of the bellows. 38 is the general designation of an insert member having a base 40 which supports an axial projection 42. The base 40 of this member may have an inclined shoulder as shown and the projection 42 may terminate as shown in a cone, or other conformation suitable for a valve to cooperate with a valve seat, or may be used to make and break an electrical circuit, or may be shaped and constructed so as to cooperate with any other suitable device or apparatus. This insert member 38 is permanently secured in the cup 34 of the movable-end of the bellows by the wall of the cup being crimped or clamped over against the shouldered base of the member as shown in Fig. 1.

A member bearing the general designation 44 is secured to the underside of the movable end of the bellows to provide a socket for loosely receiving bead 46 to operatively connect the laterally flexible member or chain 28 to the movable bellows-end. This member 44 is or may be formed of a single piece of sheet metal as shown and, in the particular form shown, consists in part of a cup 48 receiving into it the heretofore described cup 34 of the bellows-end 32. The wall of this cup 48 is inwardly crimped at 50 into clamping engagement with the wall of the cup 34, the latter in turn being clamped as already described to the base of the insert 38. The bottom of the cup 48 has a downward tubular-extension 52 having a bore and length to form a socket to receive the bead 46 which is rotatably or loosely retained therein by the inwardly contracted mouth of the tubular extension.

Figs. 2 and 3 show how the described crimping or infolding may be effected of the walls of the aforesaid cups 34 and 44 against the insert 38 by locating the parts in and between the tools 54 and 56 as shown; and then pressing the tools toward each other. Fig. 2 shows the first stage with the insert 38 seated in the cup 34 which in turn is seated in the cup 48, the walls of the two cups at this stage being vertical. The tools are then forced together to compel an infolding of the walls of both cups. Fig. 3 shows the stage where said walls are partially infolded; and Fig. 1 shows the final stage wherein the walls have been sufficiently infolded to clamp all of the parts rigidly together.

It will be seen that the foregoing is a very effective construction for attaching the flexible stop member to the inner side of the movable bellows-end and at the same time attaching the valve element 42, or its equivalent, to the outside of said bellows-end without putting a hole through the bellows-end or otherwise weakening it.

It will be understood that bellows of the type shown are usually filled with gas or a highly volatile liquid or operate from filling with gas under pressure. The member 28 forms laterally flexible means for limiting the expansion movement of the bellows and prevents breakage or damaging of the bellows due to unusual or excessive internal pressure, while it does not interfere with twisting or lateral displacement of the bellows relatively to its axis to any extent required by use.

The present improvement permits the attachment of the flexible member to the movable end of the bellows in a very satisfactory way without weakening the bellows construction or tending to produce leaks, and at the same time secures the insert 38 to the bellows-end, the described clamping action taking place against this insert, which may additionally serve as a valve or other useful element as heretofore described.

What I claim is:

1. A thermostat bellows and the like having within it a laterally-flexible, lengthwise-inextensible member connecting the movable end of the bellows with its base, said movable bellows-end having an integral inwardly cupped portion; and a member within the bellows clamped to said cupped portion, said member providing the means for attaching the laterally flexible member to the movable end of the bellows.

2. A thermostat bellows and the like having within it a laterally-flexible, lengthwise-inextensible member connecting the movable end of the bellows with its base, said movable bellows-end having an integral inwardly cupped portion; a member outside of the bellows seated in said cupped portion and clamped thereby; and a member within the bellows clamped to said cupped portion, said member providing the means for attaching the laterally flexible member to the movable end of the bellows.

3. A thermostat bellows and the like having within it a laterally-flexible, lengthwise-inextensible member connecting the movable end of the bellows with its base, said movable bellows-end having an integral inwardly cupped portion; and a member within the bellows clamped to said cupped portion, said member having a socket at its free end constituting the means for attaching the end of the laterally-flexible member to the movable bellows-end, said end of the laterally-flexible member being a bead supported in said socket.

4. A thermostat bellows and the like having within it a laterally-flexible, lengthwise-inextensible member connecting the movable end of the bellows with its base, said movable bellows-end having an integral inwardly cupped portion; a member outside of the bellows seated in said cupped portion and clamped thereby; and a member within the bellows clamped to said cupped portion, said member having a socket at its free end constituting the means for attaching the end of the laterally-flexible member to the movable bellows-end, said end of the laterally-flexible member being a bead supported in said socket.

5. A thermostat bellows and the like having within it a laterally-flexible, lengthwise-inextensible member connecting the movable end of the bellows with its base, said movable bellows-end having an integral inwardly cupped portion; a member outside of the bellows seated in said cupped portion and clamped by the wall thereof; and a separate cup within the bellows receiving and clamped to said cupped portion, said separate cup having a tubular extension from its bottom with infolded mouth forming a socket, the end of the laterally-flexible lengthwise-inextensible member consisting of a bead housed in said socket.

6. A thermostat bellows and the like having within it a laterally-flexible, lengthwise-inextensible member connecting the movable end of the bellows with its base, said movable bellows-end having an inwardly cupped portion; and a member within the bellows attached to said cupped portion, said member providing the means for attaching the laterally-flexible member to the movable end of the bellows.

7. A thermostat bellows and the like having within it a laterally-flexible, lengthwise-inextensible member connecting the movable end of the bellows with its base, said movable bellows-end having an inwardly cupped portion; a member carried by said movable bellows-end inserted and secured in said cupped portion; and a member within the bellows attached to said cupped portion, said member providing the means for attaching the laterally-flexible member to the movable end of the bellows.

JOSEPH J. McMAHON.